United States Patent [19]
Pitts et al.

[11] Patent Number: 6,085,234
[45] Date of Patent: Jul. 4, 2000

[54] REMOTE FILE SERVICES NETWORK-INFRASTRUCTURE CACHE

[75] Inventors: William M. Pitts, Los Altos; Joel R. Rigler, Aptos; Robert E. Lister, San Jose, all of Calif.

[73] Assignee: Inca Technology, Inc., Los Altos, Calif.

[21] Appl. No.: 09/121,651

[22] Filed: Jul. 23, 1998

Related U.S. Application Data

[63] Continuation-in-part of application No. 08/806,441, Feb. 26, 1997, Pat. No. 5,892,914, which is a continuation of application No. 08/343,477, Nov. 28, 1994, Pat. No. 5,611,049
[60] Provisional application No. 60/053,492, Jul. 23, 1997, and provisional application No. 60/055,928, Aug. 16, 1997.

[51] Int. Cl.[7] .................................................. G06F 15/173
[52] U.S. Cl. ........................ 709/217; 709/219; 709/226; 711/118
[58] Field of Search .................................. 709/217, 219, 709/226; 711/118

[56] References Cited

U.S. PATENT DOCUMENTS

| | | | |
|---|---|---|---|
| 4,371,929 | 2/1983 | Brann et al. | 710/45 |
| 4,422,145 | 12/1983 | Sacco et al. | 711/160 |
| 4,463,424 | 7/1984 | Mattson et al. | 711/136 |
| 4,499,539 | 2/1985 | Vosacek | 707/205 |
| 4,503,501 | 3/1985 | Coulson et al. | 711/29 |
| 4,694,396 | 9/1987 | Weisshaar et al. | 709/200 |
| 4,714,992 | 12/1987 | Gladney et al. | 707/200 |
| 4,897,781 | 1/1990 | Chang et al. | 707/201 |
| 4,975,830 | 12/1990 | Gerpheide et al. | 709/228 |
| 5,001,628 | 3/1991 | Johnson et al. | 707/10 |
| 5,056,003 | 10/1991 | Hammer et al. | 709/300 |
| 5,058,000 | 10/1991 | Cox et al. | 707/10 |
| 5,077,658 | 12/1991 | Bendert et al. | 707/1 |
| 5,109,515 | 4/1992 | Laggis et al. | 707/10 |
| 5,113,519 | 5/1992 | Johnson et al. | 707/201 |
| 5,133,053 | 7/1992 | Johnson et al. | 709/223 |
| 5,155,808 | 10/1992 | Shimizu | 709/202 |
| 5,224,205 | 6/1993 | Dinkin et al. | 709/226 |
| 5,317,727 | 5/1994 | Tsuchida et al. | 707/2 |
| 5,577,226 | 11/1996 | Percival | 711/119 |
| 5,611,049 | 3/1997 | Pitts | 707/8 |
| 5,649,102 | 7/1997 | Yamauchi et al. | 709/213 |
| 5,680,571 | 10/1997 | Bauman | 711/122 |
| 5,721,956 | 2/1998 | Martin et al. | 710/52 |
| 5,727,159 | 3/1998 | Kikinis | 709/246 |
| 5,790,886 | 8/1998 | Allen | 710/5 |
| 5,870,551 | 2/1999 | Ozden et al. | 709/219 |
| 5,918,013 | 6/1999 | Mighdoll et al. | 709/217 |
| 5,924,116 | 7/1999 | Aggarwal et al. | 711/122 |
| 5,991,810 | 11/1999 | Shapiro et al. | 709/229 |

*Primary Examiner*—Kenneth S. Kim
*Attorney, Agent, or Firm*—Donald E. Schreiber

[57] ABSTRACT

A network-infrastructure cache ("NI Cache") transparently provides proxy file services to a plurality of client workstations concurrently requesting access to file data stored on a server. The NI Cache includes a network interface that connects to a digital computer network. A file-request service-module of the NI Cache receives and responds to network-file-services-protocol requests from workstations through the network interface. A cache, also included in the NI Cache, stores data that is transmitted back to the workstations. A file-request generation-module, also included in the NI Cache, transmits requests for data to the server, and receives responses from the server that include data missing from the cache.

19 Claims, 6 Drawing Sheets

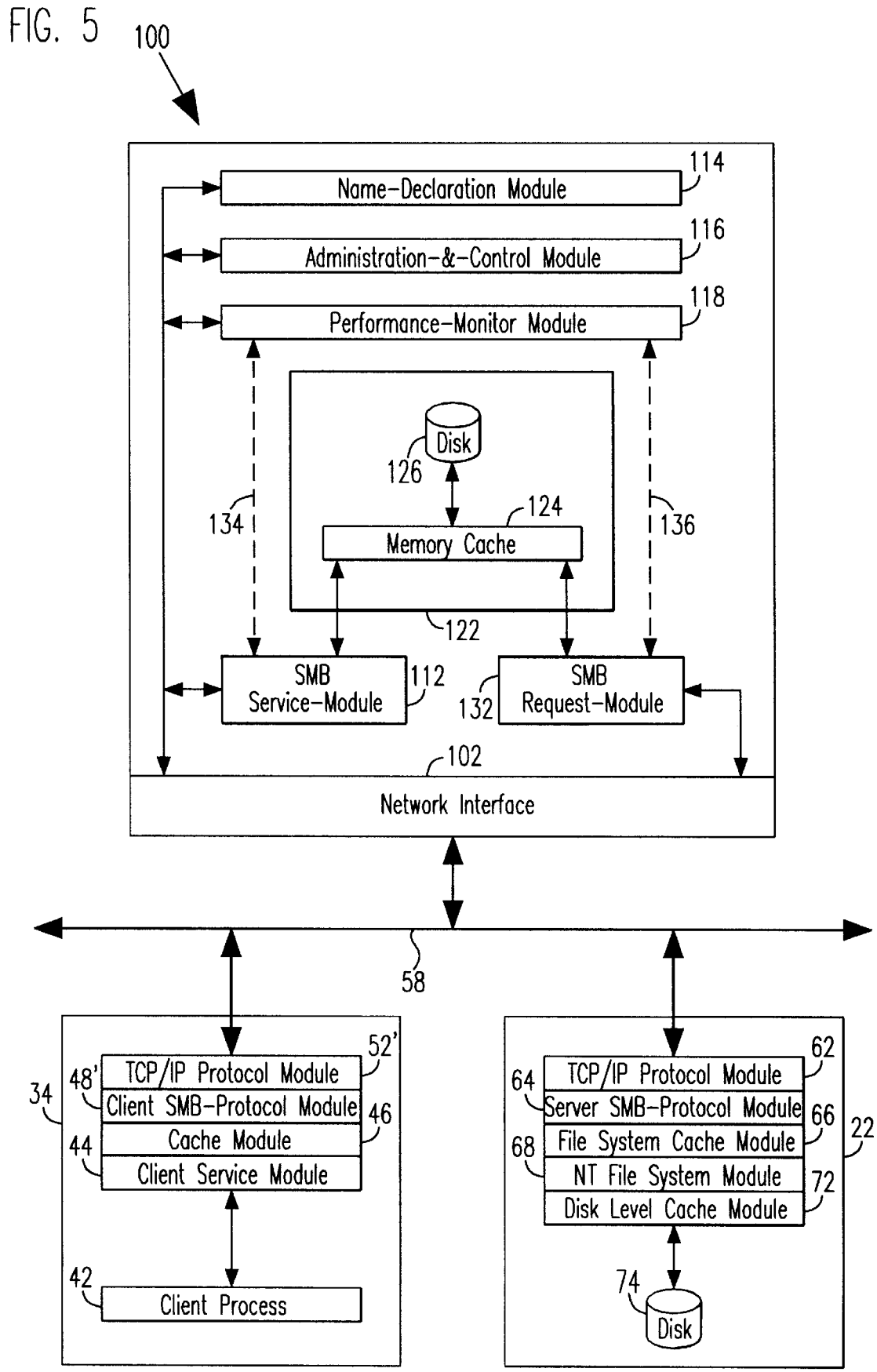

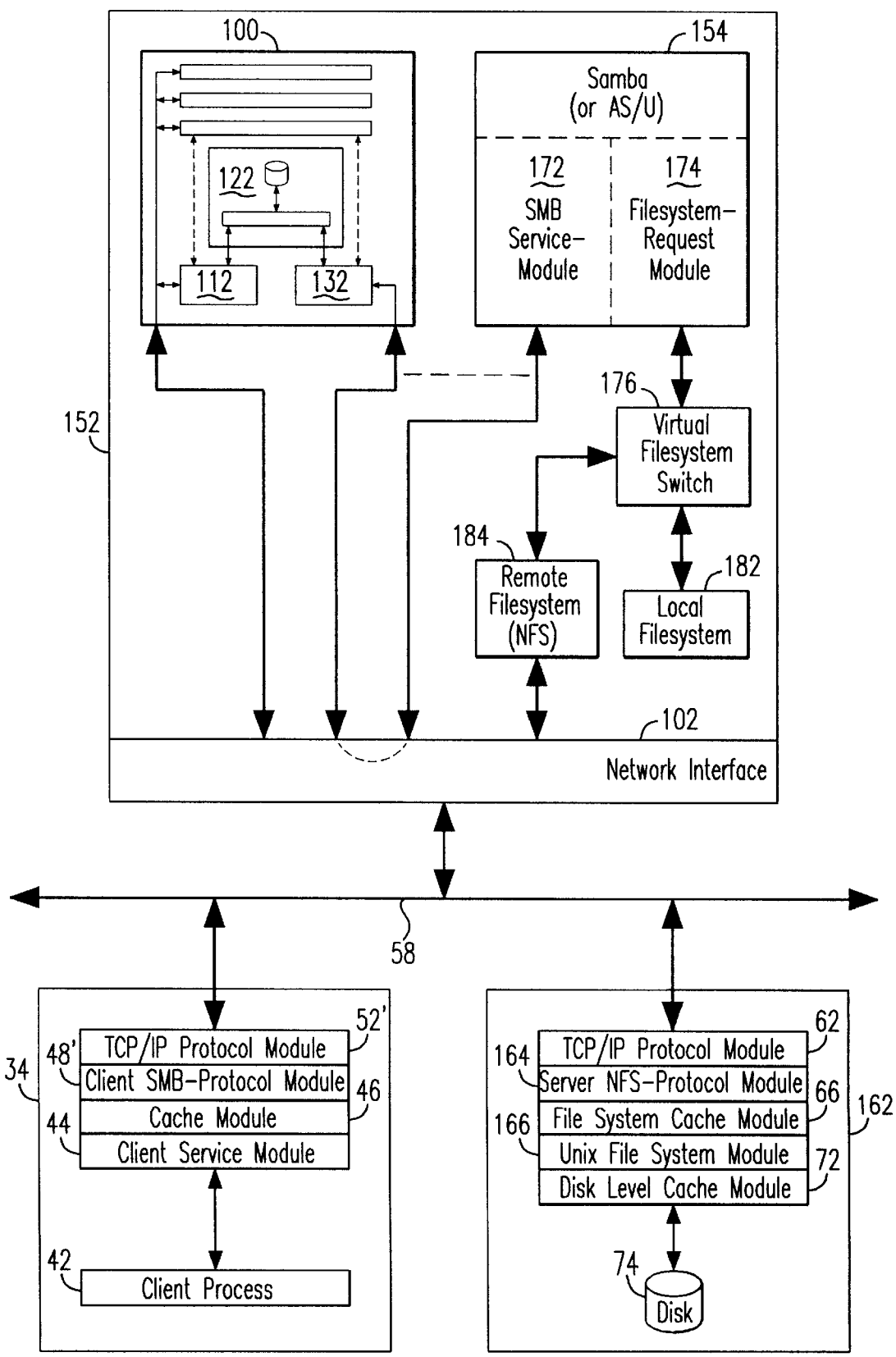

REMOTE FILE SERVICES NETWORK-INFRASTRUCTURE CACHE

CROSS REFERENCE(S) TO RELATED APPLICATION(S)

This application in a continuation-in-part of Ser. No. 08/806,441 filed Feb. 26, 1997, now issued U.S. Pat. No. 5,892,914, which is a continuation of Ser. No. 08/343,477 filed Nov. 28, 1994, that issued Mar. 11, 1997, as U.S. Pat. No. 5,611,049, and that claimed priority under 35 U.S.C. § 371 from Patent Cooperation Treaty ("PCT") International Patent Application PCT/US92/04939 filed Jun. 3, 1992. This application also claims the benefit of U.S. Provisional Patent Application Nos. 60/053,492, entitled "Remote File Service Inline Flow Through Cache" filed Jul. 23, 1997, and 60/055,928, entitled "Remote File Service Inline Flow Through Cache" filed Aug. 16, 1997.

BACKGROUND OF THE INVENTION

1. Field of the Invention

The present invention relates generally to networks of digital computers and, more particularly, to proxy file caches that are used in networks of digital computers.

2. Description of the Prior Art

FIG. 1 illustrates a network of digital computers in accordance with the prior art referred to by the general reference character 20. The network of digital computers 20 includes several file servers 22a–22f. During operation of the network of digital computers 20, the file servers 22a–22f deliver file data to client workstations 34 using Server Message Block ("SMB"), Network File System ("NFS®"), Hyper-Text Transfer Protocol ("HTTP"), Netware Core Protocol ("NCP"), or other network-file-services protocol. The file servers 22a, 22b and 22f are networked directly to a network-backbone switch 24. The network-backbone switch 24 is also networked directly to network routers 26a–26c, and to a backbone client workstation 28. Two of the network routers 26a and 26b connect through network hubs 32a–32b respectively to the servers 22c and 22d, and to clusters of client workstations 34. One of the network routers 26c is networked directly to the server 22e, and to a cluster of client workstations 34 without an intervening network hub.

While the sub-networks respectively centered at the network-backbone switch 24 and at the network routers 26a and 26b appear topologically different from the sub-network originating at the network router 26c, as is well known to those skilled in the art the two network topologies are functionally equivalent. In principle, the network of digital computers 20 permits any of the client workstations 34 and the backbone client workstation 28 to exchange file data and or messages with each other, and with any of the file servers 22a–22f. More specific to the present invention, the network of digital computers 20 permits any of the client workstations 34 and the backbone client workstation 28 to exchange file data with any of the file servers 22a–22f.

In the illustration of FIG. 1, the various arrowed lines interconnecting the file servers 22a–22f, the network-backbone switch 24, the network routers 26a–26c, the backbone client workstation 28, the network hubs 32a–32b, and the client workstations 34 indicate bidirectional digital communication paths. As is well known to those skilled in the art, such communication paths may be provided by local area networks, virtually any form of telephone communications including analog or digital circuits and leased or dial-up lines, satellite communications, or the Internet. Moreover, the network of digital computers 20 illustrated in FIG. 1 could reside entirely within a single building, or could be worldwide.

In transferring files over the network of digital computers 20 illustrated in FIG. 1, each of the file servers 22a–22f, the network-backbone switch 24, the network routers 26a–26c, the backbone client workstation 28, the network hubs 32a–32b, and the client workstations 34 employs a network-file-services protocol. All digital computer industry standard network-file-services protocols, e.g. SMB, NFS, HTTP, or NCP, employ client side file caches to improve file access performance. FIG. 2 illustrates processing flow when a Redirector, such as that included in Microsoft® Windows NT, or NFS Client Code, such as that included in Solaris and most other Unix variants, receives a read request from a Client Process 42. The following descriptions of read and write request processing by a client workstation 34 for a network-file-services protocol assume no error occurs, and no concurrent write sharing ("CWS") of a file. CWS occurs for a file when multiple client workstations 34 concurrently access the file and at least one of the client workstations 34 is writing data to the file.

File request processing by the Redirector or NFS Client Code for the read request from the Client Process 42 proceeds as follows:

1. A Client Service Module 44, that provides a File Service Application Program Interface ("API"), receives the read request, and extracts the read request's parameters (file id, offset, count).
2. A Cache Module 46 then searches a client side file cache (not depicted in any of the FIGs.) that is located at the client workstation 34.
   a) If all data specified in the read request is present within the client side file cache, the data is immediately returned to the Client Service Module 44, which returns the data to the Client Process 42.
   b) If all data specified in the read request is not present within the client side file cache, the Cache Module 46 identifies the missing data. This missing data must be fetched from one of the file servers 22a–22f that stores the file.
3. A Client File-Service-Protocol Module 48 then generates a SMB (or NFS, HTTP, NCP, . . . as appropriate) protocol read request specifying the missing data.
4. A Communication Protocol Module 52 then encapsulates the newly generated read request in a Transmission Control Protocol ("TCP") (or User Datagram Protocol ("UDP"), or Internet Packet Exchange ("IPX"), . . . as appropriate) message that is forwarded, using Internet Protocol ("IP"), via a transport layer to one of the file servers 22a–22f that stores the file.
5. Some interval of time later, the Communication Protocol Module 52 receives a TCP (or UDP, or IPX, . . . as appropriate) response message from one of the file servers 22a–22f, and de-encapsulates the SMB (or NFS, HTTP, NCP, . . . as appropriate) protocol response from the response message.
6. The Client File-Service-Protocol Module 48 then receives the SMB (or NFS, HTTP, NCP, . . . as appropriate) response, and extracts the missing file data.
7. Then, the Cache Module 46 copies the missing file data from the response message into the client side file cache. Now all file data requested by the Client Process 42 is present within the client side file cache.
8. The Cache Module 46 then returns the requested data to the Client Service Module 44.

9. The Client Service Module 44 returns the data to the Client Process 42.

FIG. 3 illustrates processing flow when the Redirector or NFS Client Code receives a write request from a Client Process 42. The Redirector or NFS Client Code processes the write request from a Client Process 42 as follows:

1. The Client Service Module 44 receives the write request, and extracts the write request's parameters (file id, offset, count).
2. The Cache Module 46 then copies the data into the cache.
   a) If the cache is operating in a "asynchronous write mode," the Cache Module 46 then immediately returns control to the Client Service Module 44, which in turn returns control to the Client Process 42).
   b) If the cache is operating in "synchronous write mode," the Cache Module 46 must successfully transmit the new file data to one of the file servers 22a–22f before returning control to the Client Service Module 44.
3. The Client File-Service-Protocol Module 48 then generates a SMB (or NFS, HTTP, NCP, . . . as appropriate) protocol write request for the new file data.
4. The Communication Protocol Module 52 then encapsulates the newly generated write request in a TCP (or UDP, or IPX, . . . as appropriate) message that is forwarded, using IP, via a transport layer to one of the file servers 22a–22f that stores the original file.
6. Some interval of time later, the Communication Protocol Module 52 receives a TCP (or UDP, or IPX, . . . as appropriate) response message from one of the file servers 22a–22f, and de-encapsulates the SMB (or NFS, HTTP, NCP, . . . as appropriate) protocol response from the response message.
7. The Client File-Service-Protocol Module 48 then checks status information included in the SMB response. If the write request failed, the Client File-Service-Protocol Module 48 re-submits the write request to that one of the file servers 22a–22f which stores the original file.
8. When the Client File-Service-Protocol Module 48 receives status information indicating that the new file data has been stored at one of the file servers 22a–22f, the Client File-Service-Protocol Module 48 returns Status (OK) to the Client Service Module 44.
9. The Client Service Module 44 then returns Status (OK) to the Client Process 42.

Details of various implementations of network-file-services protocols may differ somewhat from the preceding descriptions. For example, the cache may be structured as a "look-aside" cache instead of as a "flow-through" cache as depicted in FIGS. 2 and 3. While file read and write request processing by client workstations 34 when communicating via the Internet using the network-file-services protocol HTTP generally employ the Client Service Module 44, the Cache Module 46 and the Client File-Service-Protocol Module 48 depicted in FIGS. 2 and 3; Internet Web Browsers, which constitute client processes running on client workstations 34, themselves include and provide the Client Service Module 44, Cache Module 46 and Client File-Service-Protocol Module 48. Nevertheless, a distinctive characteristic of various contemporary network-file-services protocols is that they all locate their respective cache's before the Client File-Service-Protocol Module 48. Thus, the network-file-services communications, i.e. SMB, NFS, HTTP, or NCP, . . . as appropriate, messages flow directly between the Client File-Service-Protocol Module 48 and one of the file servers 22a–22f.

FIG. 4 illustrates location of the Cache Module 46 within the client workstation 34 relative to a Client SMB-Protocol Module 48', as well as relative to other caches included in the file servers 22a–22f. For easier understanding, FIG. 4 exclusively employs the SMB network-file-services protocol and TCP/IP network protocol for remote file access between the client workstation 34 and one of the file servers 22a–22f via a network connection 58. Those skilled in the art will recognize other network-file-services protocols such as NFS, HTTP, or NCP, . . . , as well as other network communication protocols such as UDP, or IPX, . . . as being functionally equivalent to those depicted in the illustration of FIG. 4. Similarly those skilled in the art will recognize that the network connection 58 might interconnect the client workstation 34 and the file server 22 located immediately adjacent to each other, or might interconnect the client workstation 34 and the file server 22 located half-way around the world from each other.

As illustrated in FIG. 4, the file server 22 includes a TCP/IP Protocol Module 62 and Server SMB-Protocol Module 64 that perform functions which correspond to those performed by analogous modules in the client workstation 34. The file server 22 includes a File System Cache Module 66 which operates similar to the Cache Module 46 in the client workstation 34. The file server 22 also includes a NT File System Module 68, a Disk Level Cache Module 72, and a Hard Disk 74 where the file is actually stored. Network-file-services-protocol requests generated by the client workstation 34 flow between the client workstation 34 and the file server 22 via the network connection 58 to be serviced in the file server 22. As depicted in FIG. 4, none of the contemporary network-file-services protocols locate their caches, i.e. the Cache Module 46, the File System Cache Module 66 or the Disk Level Cache Module 72, between the Client SMB-Protocol Module 48' in the client workstation 34 and the Server SMB-Protocol Module 64 in one of the file servers 22a–22f, i.e. within a Network File Services Path between the Client SMB-Protocol Module 48' in the client workstation 34 and the Server SMB-Protocol Module 64 in the file server 22. Thus as indicated in the illustration of FIG. 4, contemporary network-file-services protocols do not locate their respective caches in the Network File Services Path which includes a TCP/IP Protocol Module 52', network connection 58, and TCP/IP Protocol Module 62.

For various reasons related to the number of requests and responses being exchanged between client workstations 34 and file servers 22 over the network connection 58, the type(s) of communication link(s) included in the network connection 58, and the relative locations of the client workstations 34 and file servers 22, both physically and topologically with respect to the network, client workstations 34 can, and do, experience poor response to network-file-services-protocol requests. Moreover, inefficient utilization of network resources can and do occur due to network usage. For example, if first one then another of two client workstations 34 located immediately adjacent to each other access the same file at a remote file server 22, then the file requests and their responses both traverse the network even though the file data accessed by the later requesting client workstation 34 is literally only a short distance away. Such multiple accesses to a large file can significantly degrade network performance.

BRIEF SUMMARY OF THE INVENTION

An object of the present invention is to improve network performance.

Another object of the present invention is to accelerate network response.

Yet another object of the present invention is to reduce a network's load while enhancing network performance.

Yet another object of the present invention is to reduce a network's load while improving network file access.

Another object of the present invention is to allow two or more client workstations concurrent access to a file cached at a proxy cache server for a remote server.

Another object of the present invention is to allow two or more client workstations concurrent access to a file cached at a proxy cache server for a remote server while ensuring file consistency.

Briefly, the present invention is a network-infrastructure cache for providing proxy file services to a plurality of client workstations concurrently requesting access to file data stored on a server. A network interconnects the client workstations and the server so client workstations may transmit network-file-services-protocol requests to the server, and so that the server may transmit network-file-services-protocol responses to requesting client workstations.

The network-infrastructure cache includes a network interface that connects to the network for providing a hardware and software interface between the network-infrastructure cache and the network. The network-infrastructure cache receives and responds to network-file-services-protocol requests from client workstations for data through the network interface. The network-infrastructure cache also includes a file-request service-module for receiving via the network interface network-file-services-protocol requests transmitted by the client workstations for data for which the network-infrastructure cache provides proxy file services. The network-infrastructure cache also transmits to client workstations via the network interface network-file-services-protocol responses to the network-file-services-protocol requests.

The network-infrastructure cache includes a cache from which the file-request service-module retrieves data that is included in the network-file-services-protocol responses that the file-request service-module transmits to the client workstations. A file-request generation-module also included in the network-infrastructure cache transmits to the server via the network interface network-file-services-protocol requests for data specified in network-file-services-protocol requests received by the file-request service-module that is missing from the cache. Subsequently, the file-request generation-module receives from the server network-file-services-protocol responses that include data missing from the cache, and transmits such missing data to the cache for storage therein.

An advantage of the present invention is that since the network-infrastructure cache operates within the Network File Service Path, as described in greater detail below the network-infrastructure cache permits very unique applications such as:

1. Caching Network Routers;
2. Caching Network Hubs;
3. Network Capacitors; and
4. Protocol-Bridging caches.

These and other features, objects and advantages will be understood or apparent to those of ordinary skill in the art from the following detailed description of the preferred embodiment as illustrated in the various drawing figures.

BRIEF DESCRIPTION OF THE DRAWINGS

FIG. 5 is a block diagram depicting, together with the prior art client workstation, server, and network illustrated in FIG. 4, a network-infrastructure cache in accordance with the present invention that includes a network interface, file-request service-module, a cache, and a file-request generation-module;

FIG. 7 is a high level architectural diagram illustrating a SMB/NFS protocol-bridging network-infrastructure cache in accordance with the present invention.

DETAILED DESCRIPTION

Figure 1:
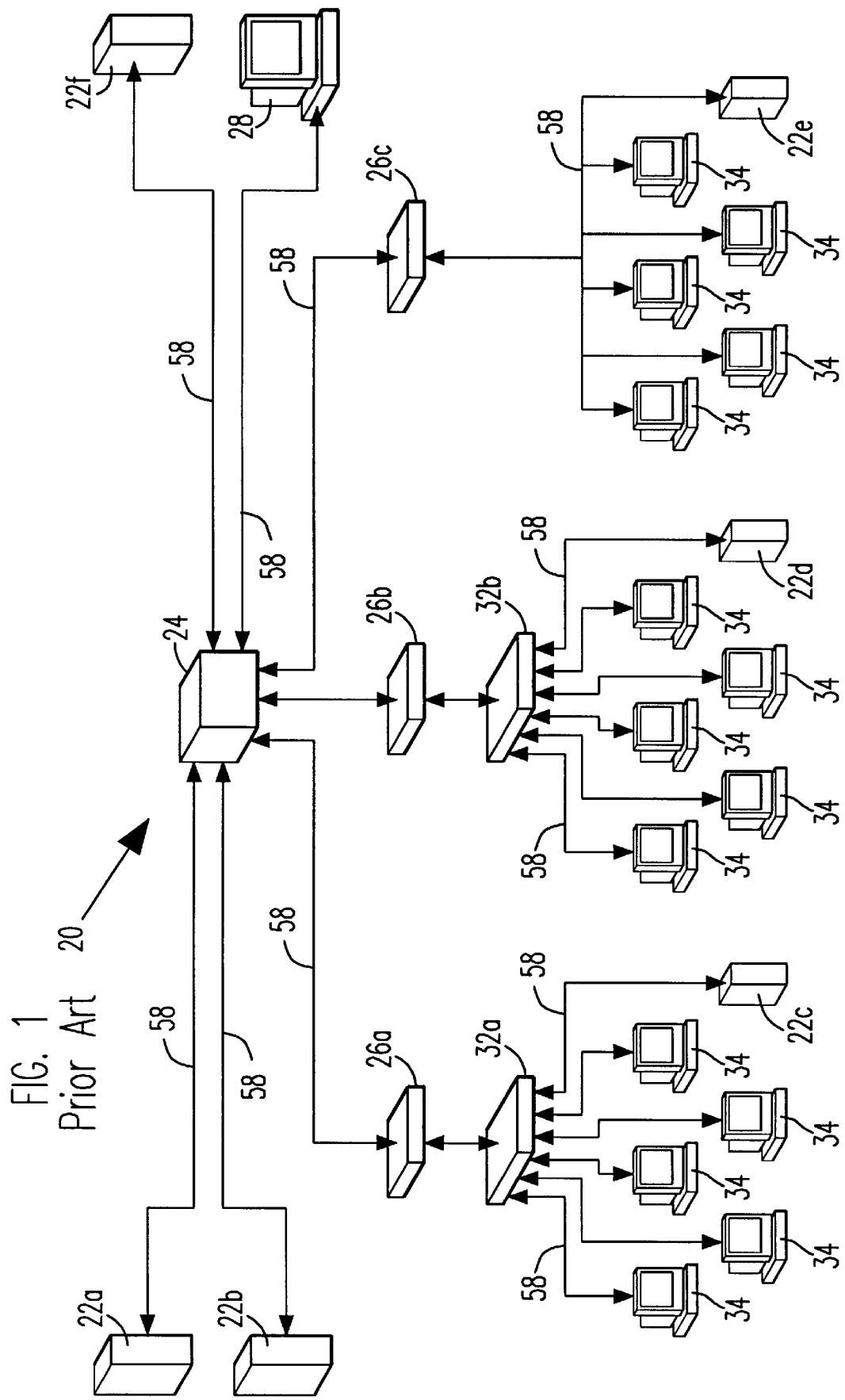
FIG. 1 is a block diagram illustrating a network of digital computers that include servers, a network backbone switch, network routers, network hubs, and client workstations in accordance with the prior art.

FIG. 5 is a block diagram illustrating a portion of the network of digital computers 20 having added thereto a network-infrastructure cache ("NI Cache") in accordance with the present invention that is referred to in FIG. 5 by the general reference character 100. As depicted in FIG. 5, the NI Cache 100 connects to the network connection 58 within the Network File Services Path between the Client SMB-Protocol Module 48' in the client workstation 34 and the Server SMB-Protocol Module 64 in the file server 22 to provide proxy file services for remote file servers 22a–22f such as those depicted in FIG. 1. While the following description of the NI Cache 100 employs exclusively the SMB network-file-services-protocol, the following description of the NI Cache 100 is equally applicable to other network-file-services-protocols such as NFS, HTTP or NCP.

Figure 2:
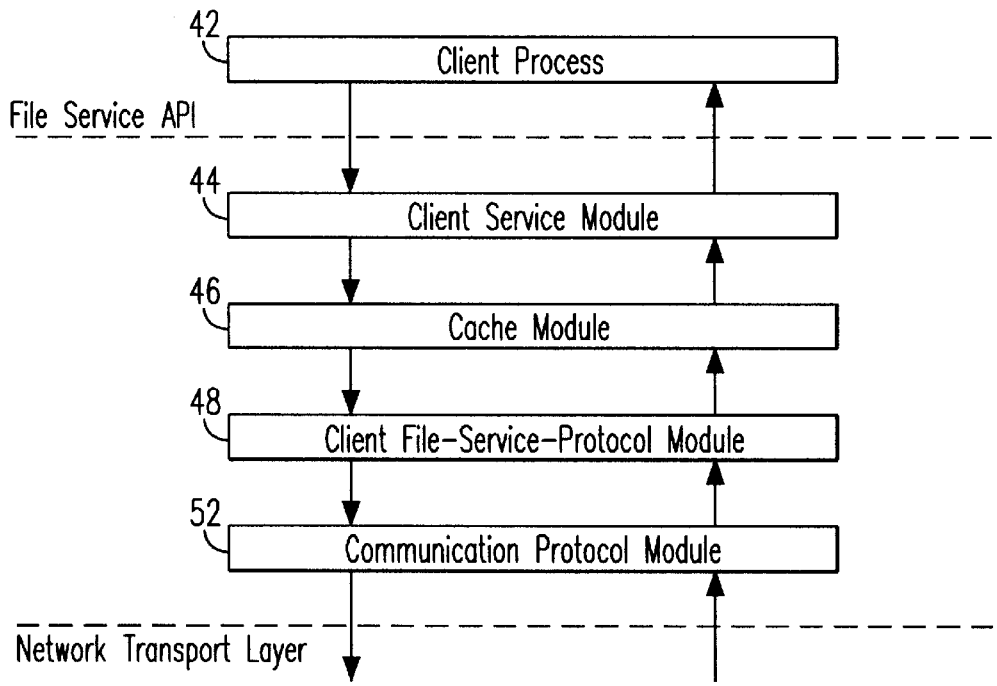
FIG. 2 is a flow diagram depicting prior art local area network ("LAN") or wide area network ("WAN") client workstation processing of a file read request.
Figure 3:
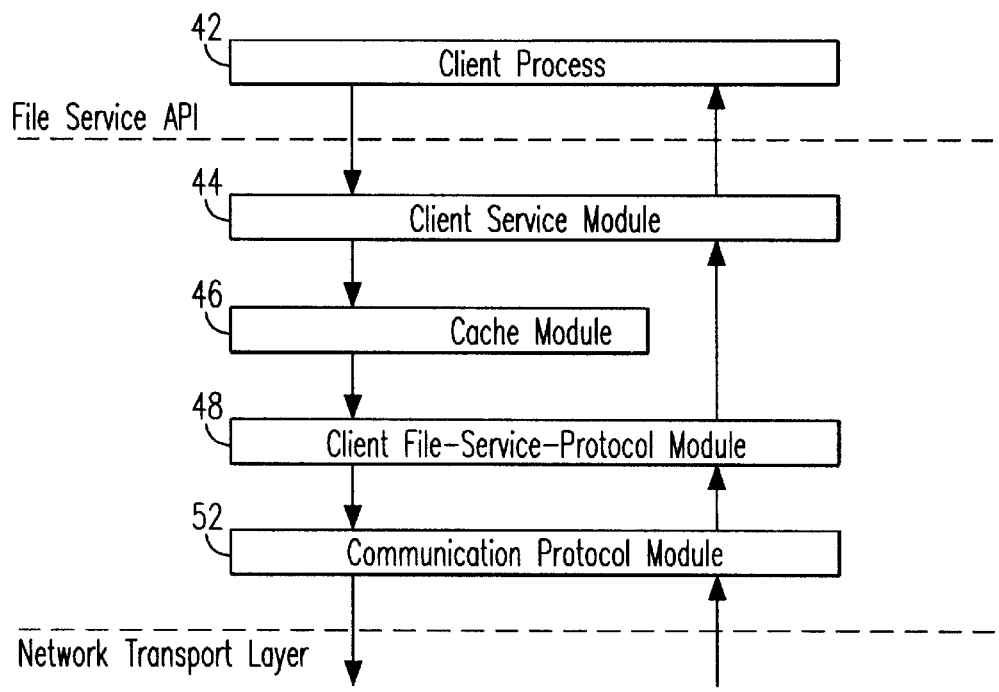
FIG. 3 is a flow diagram depicting prior art LAN or WAN client workstation processing of a file write request.
Figure 4:
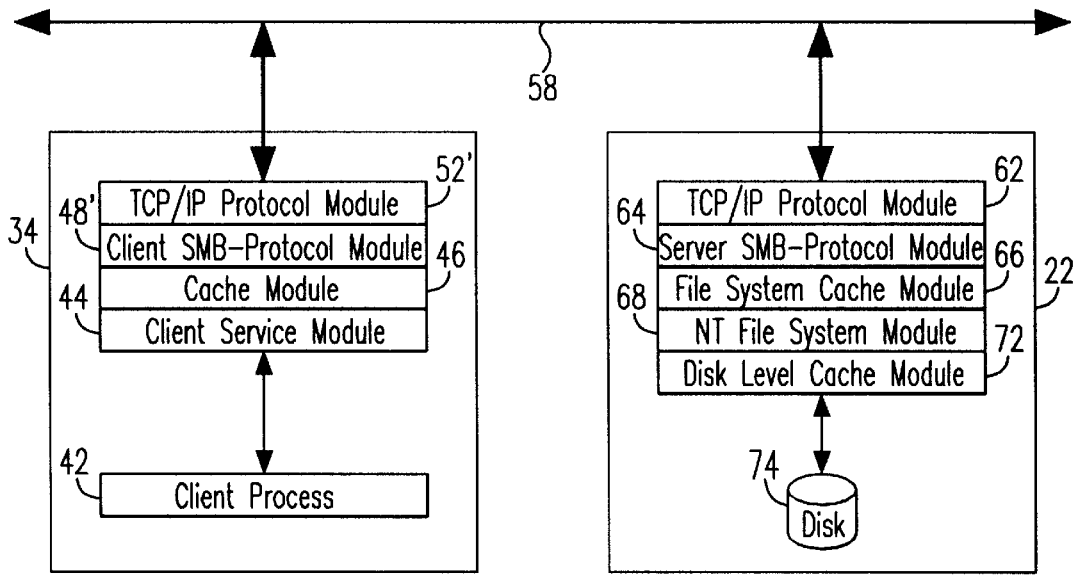
FIG. 4 is a flow diagram depicting prior art client workstation and server networked together for exchanging file read and write requests using SMB network-file-services-protocol and TCP/IP network communication.

The NI Cache 100 includes a network interface 102 that provides both a hardware and software interface to the network connection 58. The software interface receives messages from and transmits messages to the network connection 58 in accordance with a network communication protocol such as TCP/IP. Thus, with respect to the network connection 58 the network interface 102 is functionally equivalent to the Communication Protocol Module 52 included in the client workstation 34 depicted in FIGS. 2 and 3, and/or to the TCP/IP Protocol Module 62 included in the file server 22 depicted in FIG. 4.

The NI Cache 100 also includes a SMB service-module 112, a name-declaration module 114, an administration-and-control module 116, and a performance-monitor module 118. If the network interface 102 receives a TCP/IP message from the network connection 58 addressed to the NI Cache 100, or addressed to one of the remote file servers 22a–22f for which the NI Cache 100 provides proxy file services, then the network interface 102 de-encapsulates the TCP/IP message and appropriately transmits the de-encapsulated message either to the SMB service-module 112, to the name-declaration module 114, to the administration-and-control module 116, or to the performance-monitor module 118.

The SMB service-module 112 receives and responds to SMB network-file-services-protocol requests from client workstations 34 for access to data from a file stored on one of the remote file servers 22a–22f. In providing these proxy file services, the SMB service-module 112 first attempts to retrieve data from a cached image of the file, or a cached image of a portion of the file, that is present in a cache 122 which is included in the NI Cache 100. The cache 122 includes a memory cache 124 that is provided by random access memory ("RAM"), or by some other memory technology which provides equivalently rapid access and high speed performance. The cache 122 may also optionally include a hard disk 126, or equivalent technology, which provides lower cost storage than the memory cache 124, and which preserves file data if electrical power is removed from the NI Cache 100 while exhibiting lesser performance than the memory cache 124.

If a SMB network-file-services-protocol request arrives from a client workstation 34 for file data for which the NI Cache 100 provides proxy file services and all the requested file data is not present at the NI Cache 100 either in the memory cache 124 or in the optional hard disk 126, the cache 122 causes a SMB request-module 132 included in the NI Cache 100 to transmit via the network interface 102 and the network connection 58 a SMB network-file-services-protocol request for the missing file data to the remote file server 22a through 22f that stores the file. The SMB network-file-services-protocol request for file data transmitted by the SMB request-module 132 resembles the SMB network-file-services-protocol request received by the SMB service-module 112 possibly modified to specify the IP address of the remote file server 22a through 22f which stores the file, and also possibly modified to fetch only that portion of the file which is missing from the cache 122. After the remote file server 22a through 22f that stores the file transmits a SMB network-file-services-protocol response containing the requested file data to the SMB request-module 132 via the network interface 102, the SMB request-module 132 transmits such data on to the cache 122 for storage therein. After the missing file data has been stored into the cache 122, the SMB service-module 112 then retrieves the requested file data and transmits a SMB network-file-services-protocol response containing the file data to the requesting client workstation 34. Thus, SMB network-file-services-protocol requests from client workstations 34 requesting access to file data are serviced only after all requested file data is already, or becomes, present in the NI Cache 100.

In response to SMB network-file-services-protocol requests from client workstations 34 to write data to a file for which the NI Cache 100 provides proxy file services, the NI Cache 100 usually stores the file data into either or both the memory cache 124 and the optional hard disk 126, as well as transmitting a SMB network-file-services-protocol request to write the same file data on to the appropriate remote file server 22a through 22f that stores the file. Even though the file data for a write request may be stored locally within the NI Cache 100, the SMB service-module 112 usually does not transmit a response to the client workstation 34 until the SMB request-module 132 receives a response from the appropriate remote file server 22a through 22f that the data was received without error. This process of both storing write data locally within the NI Cache 100 and transmitting the SMB network-file-services-protocol request on to the appropriate remote file server 22a through 22f that stores the file is referred to as "synchronous writing." Synchronous writing ensures that the NI Cache 100 never assumes responsibility for the safety or integrity of file data being written to the remote file server 22a through 22f that stores the file.

The memory cache 124 preferably employs a least recently used ("LRU") mechanism, but may use some other mechanism, to ensure that the NI Cache 100 contains the most recently used file data. As new file data flows into the memory cache 124, the LRU file data is discarded unless the cache 122 includes the optional hard disk 126. If the cache 122 includes the hard disk 126, file data that is being discarded from the memory cache 124 is moved on to the hard disk 126. Storage of file data on the hard disk 126 is also preferably managed on an LRU basis. So, when the memory cache 124 becomes filled to capacity, the LRU file data in the hard disk 126 is discarded as newer file data flows into the hard disk 126.

Configuring the NI Cache 100 to provide proxy file services may include creating a different alias name for each of the remote file servers 22a–22f for which the NI Cache 100 provides such services. The name-declaration module 114 registers each such alias name so the NI Cache 100 appears to each of the client workstations 34 on all the network connections 58 as a file server having that alias name. The administration-and-control module 116 accepts and responds to communications which the NI Cache 100 receives from the network connection 58 specifying an operating configuration for the NI Cache 100, e.g. a communication specifying that the NI Cache 100 is to provide proxy file services for a particular one of the remote file servers 22a–22f. The performance-monitor module 118 keeps various statistics that record the performance of the NI Cache 100 such as cache hits, i.e. the number of SMB network-file-services-protocol request for which the NI Cache 100 found all the requested file data present in the cache 122, and cache misses, i.e. the number of SMB network-file-services-protocol requests for which some or all of the file data was missing from the cache 122. To permit collection of such statistics the SMB service-module 112 reports cache hits to the performance-monitor module 118 as indicated in FIG. 5 by a dashed line 134, and the SMB request-module 132 reports cache misses to the performance-monitor module 118 as indicated by a dashed line 136. The performance-monitor module 118 also provides the collected statistics via the network connection 58 to a computer program executed on one of the client workstations 34 which then displays information about the performance of the NI Cache 100.

As described above, the NI Cache 100 provides proxy file services for the remote file servers 22a–22f. In providing such proxy file services, SMB network-file-services-protocol requests may be directed via the network interface 102 to the SMB service-module 112 of the NI Cache 100 in three alternative ways: Inline Filtering, Router Redirection, and Client Redirection. The following sections describe these three alternative methods.

Inline Filtering

Figure 6:
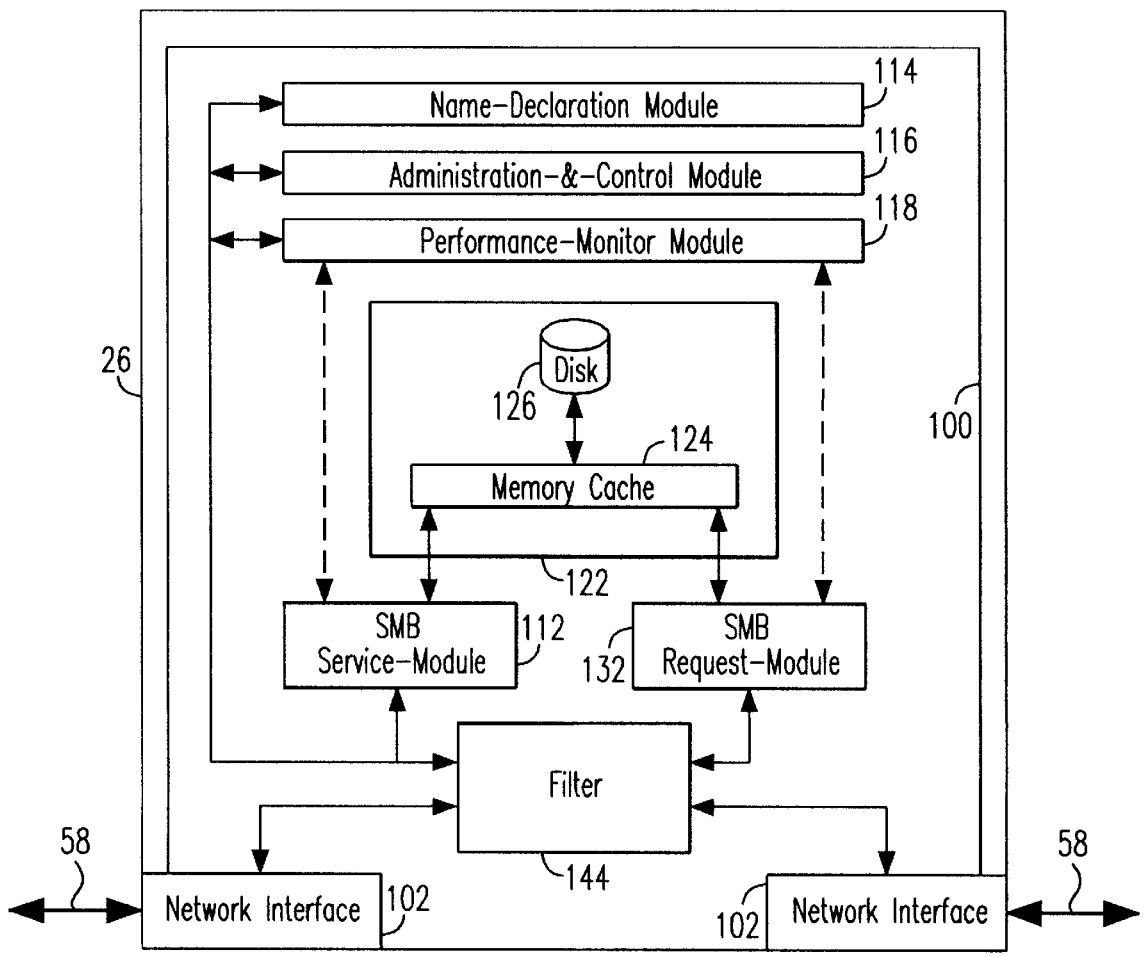
FIG. 6 is a block diagram depicting the network-infrastructure cache as illustrated in FIG. 5 incorporated into a network router that permits inline filtering of network-file-services-protocol requests.

As illustrated in FIG. 6, the NI Cache 100 may be located within the network router 26, depicted in FIG. 1, that interconnects at least two networks of digital computers 20 that use a single network layer protocol, but may respectively use different data link layer and physical layer procedures. As depicted in FIG. 6, the network router 26 inherently provides as many network interfaces 102 as there are network connections 58. The network router 26 incorporating the NI Cache 100 also includes a filter 144 through which all IP protocol messages pass. Thus, in the implementation of the NI Cache 100 depicted in FIG. 6 the filter 144 appropriately redirects all SMB network-file-services-protocol requests and responses to and from the respective remote file servers 22a–22f for which the NI Cache 100 provides proxy file services either to the SMB service-module 112 or the SMB request-module 132. All SMB network-file-services-protocol requests and responses that are not redirected to the NI Cache 100 by the filter 144 flow on unimpeded toward their respective destinations. In the manner described above, to load the cache 122 with that file data required to satisfy SMB network-file-services-protocol requests received from client workstations 34 the NI Cache 100 included in the network router 26, as necessary, transmits SMB network-file-services-protocol requests on to the remote file servers 22a–22f that store the proper file. Analogous to inclusion of the NI Cache 100 in the network router 26, the NI Cache 100 may also be included in the network hub 32 depicted in FIG. 1.

Router Redirection

Router Redirection operates somewhat similar to Inline Filtering in that SMB network-file-services-protocol requests sent by client workstations 34 specify the IP address of one of the remote file server 22a through 22f which stores the file. However, if the SMB network-file-services-protocol request passes through a network router 26 that provides Router Redirection, such as network routers offered by Cisco Systems of San Jose, Calif. that support "Transparent Proxy" services, as specified by routing table data supplied to the network router 26 by a network system administrator, a media access control ("MAC") address of the SMB network-file-services-protocol request may be changed to that of the NI Cache 100. Thus, a network system administrator can configure network routers 26 which support Transparent Proxy services to redirect SMB network-file-services-protocol requests onto the NI Cache 100.

Inline Filtering or Router Redirection are preferred ways by which the NI Cache 100 intercepts SMB network-file-services-protocol requests. However, either Router Redirection or Client Redirection must be employed when the NI Cache 100 is not located in a network node through which all SMB network-file-services-protocol requests and responses flow.

Client Redirection

Employing various methods for modifying network name services such as Domain Name Service ("DNS"), Windows Internet Name Service ("WINS"), and NetBIOS, . . . , unmodified client workstations 34 may be transparently redirected to the NI Cache 100, or to a network node such as the network router 26 or the network hub 32 that includes the NI Cache 100, instead of to the remote file servers 22a–22f for which the NI Cache 100 provides proxy file services.

One method for redirecting unmodified client workstations 34 to the NI Cache 100 is for a system administrator to modify a WINS server to include the IP address of the NI Cache 100 as one of the IP addresses of a multi-homed file server. Windows client workstations 34 automatically select an IP address on the same network subnet as they are located when the client workstations 34 query the WINS server and receive a choice of IP addresses to which the client workstations 34 may direct SMB network-file-services-protocol requests.

Note that when Inline Filtering is used, all SMB network-file-services-protocol requests redirected by the filter 144 to the NI Cache 100 specify as the destination IP address the network IP address of the remote file servers 22a–22f for which the NI Cache 100 provides proxy file services. Such SMB network-file-services-protocol requests are "intercepted" enroute to the remote file servers 22a–22f for which the NI Cache 100 provides proxy file services. However, when Client Redirection is employed, all SMB network-file-services-protocol requests reaching the NI Cache 100 specify the IP address of the network node that includes the NI Cache 100. In this way, client workstations 34 have been "redirected" to send their SMB network-file-services-protocol requests to the NI Cache 100.

If the NI Cache 100 allows SMB network-file-services-protocol requests (possibly modified) to "flow through" as described above for the network router 26 and the network hub 32, an Inline Filtering style NI Cache 100 need not modify the network destination IP address of the SMB network-file-services-protocol requests. Such SMB network-file-services-protocol requests already specify the destination IP address of the remote file server 22a through 22f for which the NI Cache 100 provides proxy file service. However, an NI Cache 100 that receives SMB network-file-services-protocol requests by Client Redirection must re-direct SMB network-file-services-protocol requests for file data that is missing from the cache 122. Thus, the NI Cache 100 must forward Client Redirection SMB network-file-services-protocol requests that specify the network destination IP address of the NI Cache 100 for file data missing from the cache 122 on to the network destination IP address of the appropriate remote file server 22a through 22f for which the NI Cache 100 provides the proxy file service. Furthermore, forwarded Client Redirection SMB network-file-services-protocol requests must also specify that SMB network-file-services-protocol responses from the remote file servers 22a–22f be returned to the network destination IP address of the NI Cache 100 rather than to the network destination IP address of the client workstation 34.

There exist several architectural configurations using the NI Cache 100 where Client Redirection is unnecessary, e.g. located in the network router 26 or the network hub 32 as described above, or located in an Intelligent I/O ("I$^2$O") card.

SMB Request Processing

The NI Cache 100 processes SMB network-file-services-protocol requests as follows:

1. If a particular SMB network-file-services-protocol request is of a type that the NI Cache 100 does not process, then the NI Cache 100 forwards the SMB network-file-services-protocol request on to the IP address of the appropriate remote file server 22a through 22f. If the NI Cache 100 includes only one network interface card ("NIC") as depicted in FIG. 5, that NIC is used to receive the SMB network-file-services-protocol request and to forward the SMB network-file-services-protocol request on to the remote file server 22a through 22f. If the NI Cache 100 includes multiple NICs such as depicted in FIG. 6 for the network router 26, it is likely that different NICs are used for receiving and forwarding SMB network-file-services-protocol requests on to the remote file server 22a through 22f.

An example of a SMB network-file-services-protocol request not handled by the NI Cache 100 is the NT_CREATE_ANDX request. Upon receiving a NT_CREATE_ANDX request the NI Cache 100 transparently passes this request through to the IP address of the appropriate remote file server 22a through 22f. This allows the NI Cache 100 to remain completely independent of the process for authenticating the client workstation 34 and for granting the client workstation 34 permission to access file data. However, the SMB network-file-services-protocol response returned from such remote file server 22a through 22f, which includes the open request's response status of either SUCCESS or ERROR together with the file-last-write-time attribute, flows back through the NI Cache 100. Because this SMB network-file-services-protocol response flows through the NI Cache 100, the NI Cache 100 can determine:

a. if the remote file server 22a through 22f granted the client workstation 34 access to file data, and b. if file data previously present in the NI Cache 100 is still current by comparing the file-last-write-time attribute returned from the remote file server 22a through 22f with that attribute stored with any cached image of file data still remaining in the cache 122.

As described in greater detail in published Patent Cooperation Treaty ("PCT") International Patent Application No. PCT/US97/23386 entitled "NDC Consistency Reconnect Mechanism" ("Consistency Reconnect PCT Patent Application") that is hereby incorporated by reference, if both conditions 1 and 2 above are satisfied, the SMB network-file-services-protocol response from the remote file server 22a through 22f:

i. authenticates file data previously stored in the cache 122; and ii. to the maximum extent possible the NI Cache 100 uses that file data in responding to subsequent SMB network-file-services-protocol requests from the client workstation 34 that successfully opened the file.

The SMB protocol employs a server-driven "opportunistic locks" ("oplocks") mechanism to provide "hard" file consistency thereby ensuring that images of file data cached at client workstations 34 remains consistent with that file data stored at the remote file server 22a through 22f. If the SMB network-file-services-protocol response from the remote file server 22a through 22f responding to the SMB network-file-services-protocol request for opening a specific file does not grant the client workstation 34 either an exclusive or read oplock for that file, then all SMB network-file-services-protocol requests from the client workstation 34 accessing that file and SMB network-file-services-protocol response from the remote file server 22a through 22f flow through the NI Cache 100, i.e. file data is not stored in the cache 122 for that particular file.

NOTE: For Windows NT, the data in a file stored at the remote file server 22a through 22f changes BEFORE the file-last-write-time attribute changes, i.e. the file-last-write-time attribute does not change until the file closes. To ensure file consistency, Windows NT provides client workstations 34 with additional protection by granting the client workstation 34 an exclusive oplock. The client workstation 34 can receive an exclusive oplock only if no other client workstation 34 has the file open. Only in Windows NT does the SMB protocol provide a level II oplock that indicates multiple client workstations 34 are reading file data, and there is no client workstation 34 writing data to the file. While no client workstation 34 is writing file data, Level II oplocks permit multiple client workstations 34 to access file data concurrently and to cache file data locally in their Cache Module 46. The level II oplock may be broken to none, if some client workstation 34 writes file data. A client workstation 34 that has been granted a level II oplock is prohibited from caching lock information, this ensures that the file data is in a consistent state if the level II oplock is broken to none. Upon breaking a level II oplock, the caching client workstation 34 that has been writing file data must flush its Cache Module 46 and degrade to performing all operations on the file at the remote Windows NT file server 22a through 22f. Correspondingly, if the cache 122 stores such file data, then the NI Cache 100 must flush the cache 122 and all SMB network-file-services-protocol requests from the client workstation 34 accessing that file and SMB network-file-services-protocol responses from the remote file server 22a through 22f flow through the NI Cache 100, i.e. caching within the NI Cache 100 is also disabled for that particular file.

2. If the SMB network-file-services-protocol request is a type that the NI Cache 100 processes, most likely a file read or write request of some sort, the cache 122 is checked to determine if:

a. caching is enabled for the file identified in the SMB network-file-services-protocol request; and b. the portion of the file specified in the SMB network-file-services-protocol request, i.e. the offset and count fields, is fully contained within the cache 122.

If both conditions 1 and 2 are satisfied and the SMB network-file-services-protocol request is a read request of some type, the appropriate file data is copied from the cache 122, is enclosed within an SMB network-file-services-protocol response, and the SMB network-file-services-protocol response is sent back to the client workstation 34. In this case, i.e. a complete cache hit, the NI Cache 100 does not send a SMB network-file-services-protocol request to the remote file server 22a through 22f for which the NI Cache 100 provides proxy file services.

If just the first condition is satisfied and the SMB network-file-services-protocol request is a read request of some type, the NI Cache 100 sends an SMB network-file-services-protocol request to the remote file server 22a through 22f for which the NI Cache 100 provides proxy file services requesting the file data that is missing from the cache 122 so that the NI Cache 100 can respond to the client workstation 34. For files for which the remote file server 22a through 22f has enabled caching, file data received from the remote file server 22a through 22f for which the NI Cache 100 provides proxy file services is usually copied to the cache 122.

If just the first condition is satisfied and the SMB network-file-services-protocol request is a write request of some type, the NI Cache 100 first copies the file data received in the SMB network-file-services-protocol request into the cache 122, and then the NI Cache 100 forwards a SMB network-file-services-protocol request to the remote file server 22a through 22f for which the NI Cache 100 provides proxy file services to write the same data into the file. When the NI Cache 100 receives a SMB network-file-services-protocol response from that remote file server 22a through 22f indicating that no error occurred, the NI Cache 100 forwards the SMB network-file-services-protocol response on to the client workstation 34.

If the first condition is not satisfied, the NI Cache 100 forwards all SMB network-file-services-protocol requests from client workstations 34 on to the remote file server 22a through 22f for which the NI Cache 100 provides proxy file services, and forwards all SMB network-file-services-protocol responses from the remote file server 22a through 22f on to appropriate client workstations 34. In effect, for files for which the remote file server 22a through 22f prohibits caching at the client workstations 34, probably due to CWS of the file, the NI Cache 100 transparently passes SMB network-file-services-protocol requests and responses between the client workstations 34 and the remote file server 22a through 22f.

Maintaining File Data Consistency

For the SMB protocol as implemented in Windows NT, the remote file server 22a through 22f that stores a specific file records all client workstations 34 accessing the file. The remote file server 22a through 22f enables caching of file data at the client workstations 34 for reading and/or writing while a CWS condition does not exist for the file. If a CWS condition occurs, the remote file server 22a through 22f transmits an "oplock break" SMB message (LOCKING_ANDX) to all client workstations 34 that the remote file server 22a through 22f records as "being active" on the file.

Because the NI Cache 100 is located between the client workstations 34 and the remote file server 22a through 22f for which the NI Cache 100 provides proxy file services, all oplock messages pass through the NI Cache 100. The NI Cache 100 interprets these oplock messages as they pass through towards the client workstations 34, and uses information in the SMB oplock messages to enable and disable storage of file data within the cache 122.

As described in greater detail above, the SMB oplock mechanism ensures the consistency of cached file data only while the file is "open." On the last close of a file, which may have been opened several times, the file server "forgets" that the file was stored in the Cache Module 46 at client workstations 34, and is completely unaware that file data was stored in the cache 122 at the NI Cache 100. In effect, the last close of a file breaks the consistency connection between the file data cached in the client workstation 34 and the source file at the remote file server 22a through 22f for which the NI Cache 100 provides proxy file services.

Preferably, the NI Cache 100 implements a mechanism described more fully in the Consistency Reconnect PCT Patent Application that enables revalidation of file data stored in the cache 122 after the consistency connection between the client workstation 34 and the remote file server 22a through 22f for which the NI Cache 100 provides proxy file services has been broken. Briefly, the reconnection mechanism operates as follows:

1. When the NI Cache 100 receives a SMB network-file-services-protocol request to open a file for which the NI Cache 100 can provide proxy file services:
   a. the SMB network-file-services-protocol request is forwarded on to the remote file server 22a through 22f for which the NI Cache 100 provides proxy file services; and usually concurrently
   b. attempts to locate file data stored locally in the cache 122.
2. When the NI Cache 100 receives the SMB network-file-services-protocol response from the remote file server 22a through 22f for which the NI Cache 100 provides proxy file services:
   a. if the SMB network-file-services-protocol response contains an ERROR status of some sort, the NI Cache 100 passes the SMB network-file-services-protocol response on to the client workstation 34.
   b. if the SMB network-file-services-protocol response lacks an oplock (either exclusive or read), then all SMB network-file-services-protocol requests from the client workstation 34 accessing that file and SMB network-file-services-protocol responses from the remote file server 22a through 22f flow through the NI Cache 100, i.e. file data is not stored in the cache 122 for that particular file.
   c. if the SMB network-file-services-protocol response contains an oplock (either exclusive or read):
      i. if the cache 122 stores data for the file and the file data is already under oplock control, then reconnection is unnecessary since the file data present in the cache 122 is valid.
      ii. if the cache 122 stores data for the file and the file data is not under oplock control, the file-last-write-time attribute in the SMB network-file-services-protocol response is compared with the file-last-write-time attribute for the file data present in the cache 122. If the two file-last-write-time attributes match, file data present in the cache 122 is revalidated and is reconnected to the file at the remote file server 22a through 22f via the Windows NT SMB oplock mechanism.

In similar way, a NFS, HTTP or NCP based NI Cache 100 employs (and extends as necessary) the native protocol's consistency mechanism to maintain cache coherency. For example, an NFS NI Cache 100 would provide "soft" file consistency by periodically issuing nfs_getattro requests to the remote file server 22a through 22f for which the NI Cache 100 provides proxy file services to detect file modifications. Note that the consistency which the NI Cache 100 provides matches the level of consistency that the corresponding network-file-services protocol inherently provides client workstations 34 if the NI Cache 100 were omitted from the network of digital computers 20.

As will be readily apparent to those skilled in the art, though not separately depicted in any of the FIGs, in general the NI Cache 100 includes at least one digital computer, preferably a microprocessor, and a RAM and/or read only memory ("ROM") that stores a computer program. Execution of the computer program by the digital computer effects operation of all the various components of the NI Cache 100 depicted in FIGS. 5 and 6 including the software portion of the network interface 102, the SMB service-module 112, the name-declaration module 114, the administration-and-control module 116, the performance-monitor module 118, the software portions of the memory cache 124 and hard disk 126, and the SMB request-module 132. Consequently, a conventional personal computer that has appropriate hardware and executes an appropriate computer program provides the NI Cache 100.

Distinguishing characteristics of the NI Cache 100 are:

1. In operational mode (as opposed to administration/configuration control modes), all communications to and from the NI Cache 100 employ network-file-services-protocol requests and responses.
2. The Cache Module 46 in client workstations 34 continues operating as before in accordance with the prior art, and is not modified in any way.
3. The file servers 22 continue operating as before in accordance with the prior art, and are not modified in any way.

While file servers 22 included in networks of digital computers 20 that include the NI Cache 100 need not be modified, if the network-file-services protocol operating on a file server 22 employs only "soft" file consistency such as that provided by NFS, it may be advantageous to upgrade the file server 22 to provide hard file consistency similar to that provided by the SMB protocol's oplocks technique.

Protocol-Bridging

As illustrated in the high level architectural diagram of FIG. 7, to provide protocol-bridging proxy file services the NI Cache 100 may be included in a computer system 152 that runs file-server software 154, such as Samba or AT&T's Advanced Server/Unix ("AS/U"). The file-server software 154 in conjunction with other computer programs running on the computer system 152 translates a request expressed in a first network-file-services protocol, e.g. SMB, into a request expressed in a second network-file-services protocol that differs from the first network-file-services protocol, e.g. NFS. The file-server software 154 also translates a response expressed in the second network-file-services protocol into a response expressed in the first network-file-services protocol. Consequently, as explained in greater detail below, the SMB/NFS protocol-bridging NI Cache 100 may receive SMB network-file-services-protocol requests from unmodified Microsoft Windows client workstations 34, and may easily request, as necessary, file data to populate the cache 122 from the computer system 152 if the file data is stored locally at the computer system 152. The NI Cache 100 may also request file data for populating the cache 122 from the remote file servers 22a–22f using the SMB network-file-services protocol, or using the NFS network-file-services protocol from a remote NFS file server 162 depicted in FIG. 7 that, for example, runs the Unix operating system. For purposes of the present invention, the NFS file server 162 depicted in FIG. 7 differs from the file server 22 depicted in FIG. 5 most significantly by replacing the Server SMB-Protocol Module 64 with a Server NFS-Protocol Module 164, and by replacing the NT File System Module 68 with a Unix File System Module 166.

In providing protocol-bridging proxy file services the NI Cache 100 included in the protocol-bridging computer system 152 operates as follows:

1. As described above, via the network interface 102 the SMB service-module 112 of the NI Cache 100 receives a SMB network-file-services-protocol request from one of the Microsoft Windows client workstations 34.

2. As described above, responding to SMB network-file-services-protocol requests from client workstations 34 initially requires storing requested file data into the cache 122. Thus while the cache 122 lacks any of the file data specified in SMB network-file-services-protocol requests received from the client workstations 34, the SMB request-module 132 of the NI Cache 100 generates a corresponding SMB network-file-services-protocol request specifying the missing file data. The SMB request-module 132 then transmits the SMB network-file-services-protocol request to the network interface 102 so the computer system 152, as appropriate, transmits such SMB request to the remote file server 22a through 22f for which the computer system 152 provides proxy file services. However, if the required file data is not stored on one of the remote file server 22a through 22f that employs the SMB protocol, the SMB network-file-services-protocol request transmitted from the SMB request-module 132 specifies the IP address of the computer system 152.

3. If the network interface 102 detects that a SMB network-file-services-protocol request from the NI Cache 100 specifies the IP address of the computer system 152, rather than forwarding the SMB network-file-services-protocol request to the network connection 58 the network interface 102 transmits the self-addressed SMB network-file-services-protocol request to a SMB Service-Module 172 included in the file-server software 154 as indicated by a curved, dashed line within the network interface 102 depicted in FIG. 7.

4. Upon arrival of the SMB network-file-services-protocol request at the file-server software 154, a Filesystem-Request Module 174 included in the file-server software 154 then generates a conventional filesystem request for the operating system running on the computer system 152 that requests the file data that the cache 122 lacks.

5. The file-server software 154 then transmits the filesystem request to a Virtual Filesystem Switch 176 included in the computer system 152.

6. If the filesystem request specifies file data stored at the computer system 152, the Virtual Filesystem Switch 176 forwards the filesystem request onto a Local Filesystem 182 which fetches the file data locally at the computer system 152 and returns the file data to the Filesystem-Request Module 174.

7. If the filesystem request specifies file data stored on the remote NFS file server 162, the Virtual Filesystem Switch 176 forwards the filesystem request to a Remote Filesystem 184 that then generates and forwards to the network interface 102 a NFS network-file-services-protocol request to retrieve from the NFS file server 162 the file data missing from the cache 122.

8. In response to receiving the NFS network-file-services-protocol request from the computer system 152, the NFS file server 162 transmits a NFS network-file-services-protocol response containing the requested file data back to the computer system 152.

9. Upon arrival of the NFS network-file-services-protocol response at the computer system 152, the network interface 102 forwards the NFS network-file-services-protocol response onto the Remote Filesystem 184 which, similar to the Local Filesystem 182, then transmits to the Virtual Filesystem Switch 176 the missing file data received from the remote NFS file server 162.

10. Regardless of whether the Virtual Filesystem Switch 176 receives the missing file data from the Local Filesystem 182 or from the Remote Filesystem 184, the Virtual Filesystem Switch 176 returns that file data to the Filesystem-Request Module 174.

11. Upon arrival of the missing file data at the file-server software 154, the SMB Service-Module 172 then forwards to the network interface 102 a SMB network-file-services-protocol response which specifies the IP address of the computer system 152, and which contains the file data missing from the cache 122.

12. If the network interface 102 detects that a SMB network-file-services-protocol response from the file-server software 154 specifies the IP address of the computer system 152, rather than forwarding the SMB network-file-services-protocol request to the network connection 58 the network interface 102 transmits the self-addressed SMB network-file-services-protocol response to the SMB request-module 132 of the NI Cache 100 again as indicated by the curved, dashed line within the network interface 102 depicted in FIG. 7.

13. As described previously, the missing file data received by the SMB request-module 132 is stored into the cache 122 and the SMB service-module 112 of the NI Cache 100 then forwards via the network interface 102 a SMB network-file-services-protocol response containing all requested file data to the requesting client workstation 34.

While in the preceding description SMB network-file-services-protocol requests and responses exchanged between the NI Cache 100 and the file-server software 154 pass through the network interface 102, those skilled in the art will recognize that the computer programs of the NI Cache 100 and the file-server software 154 may be more tightly coupled to each other, as indicated in FIG. 7 by a horizontal dashed line between them, so the two computer programs directly exchange such requests and responses.

Self-Configuration

Figure 8:
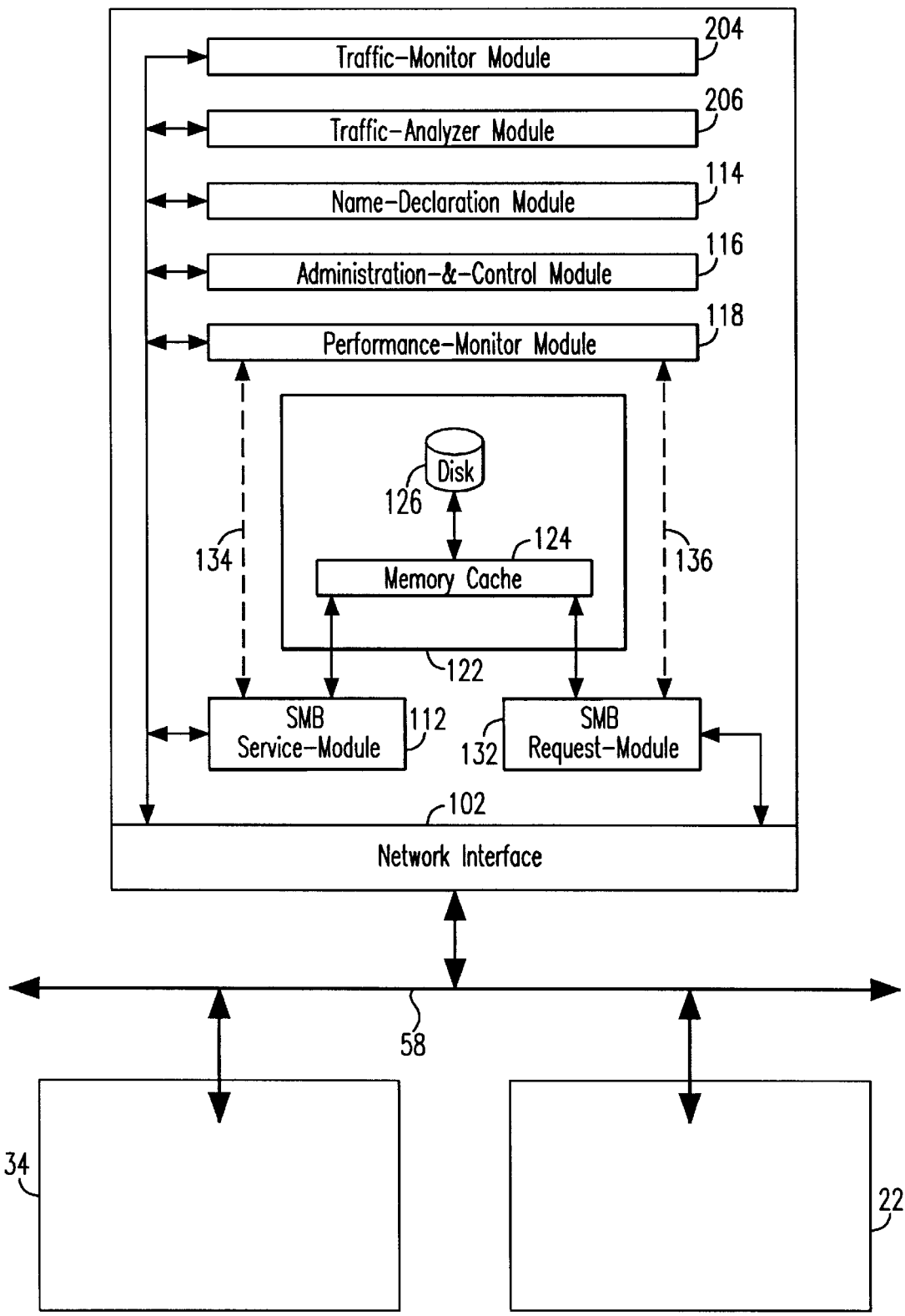
FIG. 8 is a block diagram depicting, together with the prior art client workstation, server, and network illustrated in FIG. 4, a network-infrastructure cache in accordance with the present invention configured to operate as a network capacitor.

The NI Cache 100 that receives SMB network-file-services-protocol requests by Client Redirection may be made self-configuring thereby providing a Network Capacitor denoted in FIG. 8 by the general reference character 200. In addition to the name-declaration module 114, the administration-and-control module 116 and the performance-monitor module 118 of the NI Cache 100, the Network Capacitor 200 includes a Traffic-Monitor Module 204 and a Traffic-Analyzer Module 206. The Network Capacitor 200 is self-configured for providing proxy file services as follows:

1. The Network Capacitor 200 is attached to the network of digital computers 20 and power is turned on.
2. The Network Capacitor 200 then promiscuously listens to and the Traffic-Monitor Module 204 logs all SMB network-file-services-protocol requests and responses occurring on network connections 58.
3. The Traffic-Analyzer Module 206 of the Network Capacitor 200 then associates SMB network-file-services-protocol responses with their respective SMB network-file-services-protocol requests, and determines an average response time between SMB network-file-services-protocol requests and SMB network-file-services-protocol responses for each file server 22.
4. The Traffic-Analyzer Module 206 of the Network Capacitor 200 then identifies "slow" remote file servers 22a–22f, and selects some (or all) of the "slow" remote file servers 22 as "needing assistance".
5. For each remote file server 22a through 22f selected by the Traffic-Analyzer Module 206, the name-declaration module 114 of the Network Capacitor 200 utilizing Client Redirection modifies various network name services such as DNS, WINS, and/or NetBIOS, . . . , such that the IP address of the Network Capacitor 200 is registered as an IP address for the selected remote file server 22a through 22f.

Subsequently, when, for example, one of the client workstations 34 queries the WINS server for the IP address of the selected remote file server 22a through 22f, the client workstation 34 receives a list of IP addresses that includes the IP address of the Network Capacitor 200. If the Network Capacitor 200 is connected to the same subnet as the client workstation 34 and the remote file server 22a through 22f is on a different subnet, the client workstation 34 will chose the "closest" IP address which will be the IP address of the Network Capacitor 200.

NOTE: Other factors in addition to average response time may be employed in selecting which remote file server 22a through 22f are to receive proxy file services from the Network Capacitor 200. In particular, SMB network-file-services-protocol requests that originate on one subnet of the network of digital computers 20 and are directed to remote file servers 22a–22f on a different subnet are most likely to benefit by receiving proxy file services from the Network Capacitor 200.

Network Capacitors

The Network Capacitor 200 is a specially modified hard disk drive that includes all the hardware of NI Cache 100 mounted on the disk drive's electronics board with the NI Cache 100 replacing the hard disk's conventional interface, e.g. Integrated Drive Electronics ("IDE"), AT Attachment ("ATA"), Small Computer System Interface ("SCSI"), . . . . Also included on the Network Capacitor 200 is all the software of the NI Cache 100 together with real-time operating system software, and all necessary disk drive control software. This software is preferably stored in permanent storage included in the Network Capacitor 200, such as on the hard disk 126. The stored software is executed by a microprocessor also mounted on the electronics board of the hard disk 126. RAM also located on the disk-drive's electronics board provides "working space" for the memory cache 124 of the cache 122, and for the software included in the Network Capacitor 200.

Network Capacitors 200 may be simply attached to the network of digital computers 20 forgotten. Network Capacitors 200 automatically self-configure themselves as described above so the client workstations 34 are soon transparently redirected to the Network Capacitors 200, which provide the proxy file services of the NI Cache 100.

Although the present invention has been described in terms of the presently preferred embodiment, it is to be understood that such disclosure is purely illustrative and is not to be interpreted as limiting. For example, the phrase file server 22, or even just the word "server," includes an Internet Web Server that communicates with Internet Web Browsers running on client workstations 34 using the network-file-services protocol HTTP. Consequently, without departing from the spirit and scope of the invention, various alterations, modifications, and/or alternative applications of the invention will, no doubt, be suggested to those skilled in the art after having read the preceding disclosure. Accordingly, it is intended that the following claims be interpreted as encompassing all alterations, modifications, or alternative applications as fall within the true spirit and scope of the invention.

What is claimed is:

1. A network-infrastructure cache for providing proxy services to a plurality of client workstations concurrently requesting access to data stored on a server; the client workstations and the server being interconnected by a network via which client workstations may transmit network-file-services-protocol requests to the server, and via which the server transmits network-file-services-protocol responses to requesting client workstations; the network-infrastructure cache comprising:

a network interface that connects to the network for providing a hardware and software interface to the network through which the network-infrastructure cache receives and responds to network-file-services-protocol requests from client workstations for data for which the network-infrastructure cache provides proxy services;

a file-request service-module for receiving via said network interface network-file-services-protocol requests transmitted by the client workstations for data for which the network-infrastructure cache provides proxy services, and for transmitting to client workstations via said network interface network-file-services-protocol responses to the network-file-services-protocol requests;

a cache from which said file-request service-module retrieves data that is included in the network-file-services-protocol responses that said file-request service-module transmits to the client workstations; and a file-request generation-module for transmitting to the server via said network interface network-file-services-protocol requests for data specified in network-file-services-protocol requests received by said file-request service-module that is missing from said cache, for receiving from the server network-file-services-protocol responses that include data missing from said cache, and for transmitting such missing data to said cache for storage therein.

2. The network-infrastructure cache of claim 1 wherein client workstations transmit network-file-services-protocol requests using Hyper-Text Transfer Protocol ("HTTP").

3. The network-infrastructure cache of claim 1 wherein the server transmits network-file-services-protocol responses using HTTP.

4. The network-infrastructure cache of claim 1 wherein client workstations transmit network-file-services-protocol requests using Server Message Block ("SMB").

5. The network-infrastructure cache of claim 1 wherein the server transmits network-file-services-protocol responses using SMB.

6. The network-infrastructure cache of claim 1 wherein client workstations transmit network-file-services-protocol requests using Network File System ("NFS®").

7. The network-infrastructure cache of claim 1 wherein the server transmits network-file-services-protocol responses using NFS.

8. The network-infrastructure cache of claim 1 wherein client workstations transmit network-file-services-protocol requests using Netware Core Protocol ("NCP").

9. The network-infrastructure cache of claim 1 wherein the server transmits network-file-services-protocol responses using NCP.

10. The network-infrastructure cache of claim 1 further comprising a filter, said filter redirecting to said file-request service-module network-file-services-protocol requests received by said network interface that are addressed by client workstations to the server, and said filter also redirecting to said file-request generation-module network-file-services-protocol responses received by said network interface that are addressed by the server to client workstations.

11. The network-infrastructure cache of claim 1 wherein said network interface is included in a network router that interconnects two networks.

12. The network-infrastructure cache of claim 1 wherein said network interface is included in a network hub that interconnects two network connections of the network.

13. The network-infrastructure cache of claim 1 wherein network-file-services-protocol requests received by said file-request service-module are addressed to the network-infrastructure cache by client workstations, and network-file-services-protocol responses received by said file-request generation-module are addressed to the network-infrastructure cache by the server.

14. The network-infrastructure cache of claim 1 wherein said cache includes a memory cache.

15. The network-infrastructure cache of claim 14 wherein said cache includes a disk cache.

16. The network-infrastructure cache of claim 1 further comprising:
a Performance-Monitor Module for keeping various statistics that record performance of the network-infrastructure cache; and
an Administration-and-Control Module for accepting and responding to communications specifying an operating configuration for the network-infrastructure cache.

17. The network-infrastructure cache of claim 16 further comprising:
a Name-Declaration Module for informing a network name service that the network-infrastructure cache is to provide proxy services for the server.

18. The network-infrastructure cache of claim 1 further comprising:
a Traffic-Monitor module for logging all network-file-services-protocol requests and responses occurring on the network;
a Traffic-Analyzer Module for associating logged network-file-services-protocol responses with logged requests, for determining an average response time between associated network-file-services-protocol requests and network-file-services-protocol responses, and for determining if the server needs assistance; and
a Name-Declaration Module for informing a network name service that the network-infrastructure cache is to provide proxy services for the server that needs assistance.

19. A protocol-bridging network-infrastructure cache for providing proxy services to a plurality of client workstations concurrently requesting access to data stored on a server; the client workstations and the server being interconnected by a network via which client workstations may transmit network-file-services-protocol requests to the server, and via which the server transmits network-file-services-protocol responses to requesting client workstations; the network-infrastructure cache comprising:
a. a network interface that connects to the network for providing a hardware and software interface to the network through which the network-infrastructure cache receives and responds to network-file-services-protocol requests from client workstations for data for which the network-infrastructure cache provides proxy services;
b. a file-request service-module for:
   i. receiving via said network interface network-file-services-protocol requests that are transmitted by the client workstations for data for which the network-infrastructure cache provides proxy services, and that are expressed in a first network-file-services protocol; and
   ii. transmitting to client workstations via said network interface in the first network-file-services protocol network-file-services-protocol responses to the network-file-services-protocol requests;
c. a cache from which said file-request service-module retrieves data that is included in the network-file-services-protocol responses that said file-request service-module transmits to the client workstations;
d. a file-request generation-module for:
   i. transmitting to the server via said network interface network-file-services-protocol requests expressed in the first network-file-services protocol for data specified in network-file-services-protocol requests received by said file-request service-module that is missing from said cache;
   ii. receiving in the first network-file-services protocol network-file-services-protocol responses that include data missing from said cache, and
   iii. transmitting such missing data to said cache for storage therein; and
e. protocol-translation means which:
   i. upon detecting that the server to which network-file-services-protocol requests generated by said file-request generation-module are addressed does not respond to network-file-services-protocol requests expressed in the first network-file-services protocol, translates network-file-services-protocol requests expressed in the first network-file-services protocol into network-file-services-protocol requests expressed in a second network-file-services protocol that differs from the first network-file-services protocol and to which the server responds; and
   ii. upon detecting that network-file-services-protocol responses received from the server directed to the file-request generation-module are expressed in the second network-file-services protocol, translates the network-file-services-protocol responses into network-file-services-protocol responses expressed in the first network-file-services protocol.

* * * * *

UNITED STATES PATENT AND TRADEMARK OFFICE
CERTIFICATE OF CORRECTION

| | | |
|---|---|---|
| PATENT NO. | : 6,085,234 | Page 1 of 1 |
| APPLICATION NO. | : 09/121651 | |
| DATED | : July 4, 2000 | |
| INVENTOR(S) | : William R. Pitts, Joel R. Rigler and Robert E. Lister | |

It is certified that error appears in the above-identified patent and that said Letters Patent is hereby corrected as shown below:

Title page Item (63) delete, "continuation of application No. 08/343,477" and insert therefor -- divisional of application No. 08/343,477 --.

Column 9, line 9, delete "continuation" and insert therefor -- divisional --.

Signed and Sealed this
Twelfth Day of June, 2012

David J. Kappos
*Director of the United States Patent and Trademark Office*

(12) EX PARTE REEXAMINATION CERTIFICATE (6787th)
United States Patent
Pitts et al.

(10) Number: US 6,085,234 C1
(45) Certificate Issued: *Apr. 28, 2009

(54) REMOTE FILE SERVICES NETWORK-INFRASTRUCTURE CACHE

(75) Inventors: William M. Pitts, Los Altos, CA (US); Joel R. Rigler, Aptos, CA (US); Robert E. Lister, San Jose, CA (US)

(73) Assignee: Network Caching Technology, L.L.C., Palo Alto, CA (US)

Reexamination Request:
No. 90/007,193, Sep. 7, 2004

Reexamination Certificate for:
Patent No.: 6,085,234
Issued: Jul. 4, 2000
Appl. No.: 09/121,651
Filed: Jul. 23, 1998

(*) Notice: This patent is subject to a terminal disclaimer.

Related U.S. Application Data

(63) Continuation-in-part of application No. 08/806,441, filed on Feb. 26, 1997, now Pat. No. 5,892,914, which is a continuation of application No. 08/343,477, filed on Nov. 28, 1994, now Pat. No. 5,611,049.

(60) Provisional application No. 60/055,928, filed on Aug. 16, 1997, and provisional application No. 60/053,492, filed on Jul. 23, 1997.

(51) Int. Cl.
*G06F 15/16* (2006.01)
*G06F 15/173* (2006.01)

(52) U.S. Cl. .................. 709/217; 709/219; 709/226; 711/118

(58) Field of Classification Search .............. 709/201, 709/213–216, 217–219, 223–226, 238; 707/10; 711/117, 118–146
See application file for complete search history.

(56) References Cited

U.S. PATENT DOCUMENTS

| | | | |
|---|---|---|---|
| 4,887,204 A | 12/1989 | Johnson et al. | 707/10 |
| 4,888,681 A | 12/1989 | Barnes et al. | 707/101 |
| 5,012,405 A | 4/1991 | Nishikado et al. | 707/8 |
| 5,146,561 A | 9/1992 | Carey et al. | 709/200 |
| 5,163,131 A | 11/1992 | Row et al. | 209/202 |
| 5,175,851 A | 12/1992 | Johnson et al. | 707/8 |
| 5,222,242 A * | 6/1993 | Choi et al. | 709/227 |
| 5,305,440 A | 4/1994 | Morgan et al. | 709/203 |
| 5,315,707 A | 5/1994 | Seaman et al. | 395/250 |
| 5,347,632 A | 9/1994 | Filepp et al. | 395/200 |
| 5,452,447 A * | 9/1995 | Nelson et al. | 707/205 |
| 5,511,208 A * | 4/1996 | Boyles et al. | 709/223 |
| 5,568,181 A * | 10/1996 | Greenwood et al. | 725/92 |
| 5,727,159 A | 3/1998 | Kikinis | 709/246 |
| 5,764,972 A | 6/1998 | Crouse et al. | 707/1 |

(Continued)

FOREIGN PATENT DOCUMENTS

| JP | 3-5847 | 11/1990 |
|---|---|---|
| JP | 2-309445 | 11/1990 |

OTHER PUBLICATIONS

Auerbach, J., "TACT: A Protocol Conversion Toolkit," IEEE Journal on Selected Areas in Communications, vol. 8, No. 1, pp. 143–159, 1990.

(Continued)

*Primary Examiner*—Majid A. Banankhah

(57) ABSTRACT

A network-infrastructure cache ("NI Cache") transparently provides proxy file services to a plurality of client workstations concurrently requesting access to file data stored on a server. The NI Cache includes a network interface that connects to a digital computer network. A file-request service-module of the NI Cache receives and responds to network-file-services-protocol requests from workstations through the network interface. A cache, also included in the NI Cache, stores data that is transmitted back to the workstations. A file-request generation-module, also included in the NI Cache, transmits requests for data to the server, and receives responses from the server that include data missing from the cache.

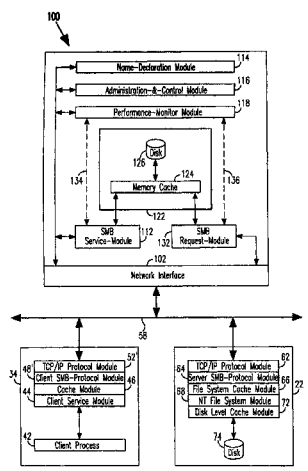

U.S. PATENT DOCUMENTS

| | | | | | |
|---|---|---|---|---|---|
| 5,864,852 | A | * | 1/1999 | Luotonen | 709/246 |
| 5,878,218 | A | | 3/1999 | Maddalozzo et al. | 709/218 |
| 5,918,013 | A | | 6/1999 | Mighdoll et al. | 709/217 |
| 5,924,116 | A | | 7/1999 | Aggarwal et al. | 711/122 |
| 5,944,780 | A | | 8/1999 | Chase et al. | 709/201 |
| 5,991,810 | A | | 11/1999 | Shapiro et al. | 709/229 |
| 6,065,043 | A | * | 5/2000 | Domenikos et al. | 709/203 |
| 6,351,775 | B1 | * | 2/2002 | Yu | 709/238 |
| 6,377,991 | B1 | * | 4/2002 | Smith et al. | 709/226 |

OTHER PUBLICATIONS

Austin, P. B., "Towards a File System for a Scalable Parallel Computing Engine,". Department of Computer Science, University of York, Mar. 1992.

Austin, P., Murray, K. A., Wellings, A., "Wisdom: A Prototype Scalable Operating System," Proceedings of the Second IEEE Workshop on Experimental Distributed Systems, pp. 106–112, Oct. 1990.

Austin, P. B., Murray, K. A., Wellings, A. J., "File System Caching in Large Point–to–Point Networks," Software Engineering Journal, pp. 65–80, Jan. 1992.

Austin, P. B., Murray, K. A., Wellings, A. J., "Early Experiences with the Construction of a Scalable Parallel Operating System," Department of Computer Science, University of York, Nov. 1990.

Austin, P., Murray, K., Wellings, A., "The Design of an Operating System for a Scalable Parallel Computing Engine," Software—Practice and Experience, vol. 21(10), pp. 989–1013, Oct. 1991.

Austin, P., Murray, K., Wellings, A., "The Design of Scalable Parallel Operating Systems," Department of Computer Science, University of York, Nov. 1989.

Austin, P. B., Murray, K. A., Wellings, A. J., "File System Caching in Large Point–to–Point Networks," Department of Computer Science, University of York, Aug. 1990.

Austin, P. B., Murray, K. A., Wellings, A. J., "The Design and Implementation of the Sage Parallel File System," Department of Computer Science, University of York, Nov. 1990.

Biersack, E. W., "A Systematic Approach for Constructing Gateways," Computer Networks and ISDN Systems, 18, pp. 79–95, 1989–90.

Blaze, M. A., "Caching in Large–Scale Distributed File Systems," Department of Computer Science, Princeton University, Jan. 1993.

Blaze, M., Alonso, R., "Long–Term Caching Strategies for Very Large Distributed File Systems," CS–TR–321–91, Department of Computer Science, Princeton University, Apr. 1991.

Blaze, M., Alonso, R., "Long–Term Caching Strategies for Very Large Distributed File Systems," Proceedings of the USENIX Summer Technical Conference, pp. 3–16, Jun. 1991.

Bochmann, G. V., Mondain–Monval, P., "Design Principles for Communication Gateways," IEEE Journal on Selected Areas in Communication, vol. 8, No. 1, Jan. 1990.

Bowman, C. M., Danzig, P. B., Hardy, D. R., Manber, U., Schwartz, M. F., "Harvest: A Scalable, Customizable Discovery and Access System," CU–CS–732–94, Department of Computer Science, University of Colorado at Boulder, Jul. 1994.

Bowman, C. M., Danzig, P. B., Schwartz, M. F., "Research Problems for Scalable Internet Resource Discovery," CU–CS–643–93, Department of Computer Science, University of Colorado at Boulder, Mar. 1993.

Calvert, K. L., Lam, S. S., "Adaptors for Protocol Conversion," Proceedings IEEE INFOCOM '90, pp. 552–560, Jun. 1990.

Cate, V., "Alex—A Global Filesystem," Proceedings of the USENIX File System Workshop, pp. 1–11, May 1992.

Chankhunthod, A., Danzig, P. B., Neerdaels, C., Schwartz, M. F., Worrell, K. J., "A Hierarchical Internet Object Cache," CU–CS–766–95, Department of Computer Science, University of Colorado at Boulder, Mar. 1995.

Chankhunthod, A,, Danzig, P. B., Neerdaels, C., Schwartz, M. F., Worrell, K. J., "A Hierarchical Internet Object Cache," Proceedings of the USENIX Annual Technical Conference, pp. 153–164, Jan. 1996.

Craig, E., Karraker, R., "Universal Server Under Development," MacWeek 31, Oct. 1989.

Danzig, P. B., Hall, R. S., Schwartz, M. F., "A Case for Caching File Objects Inside Internetworks," CU–CS–642–93, Department of Computer Science, University of Colorado at Boulder, Mar. 1993.

Feldmeier, D. C., "Improving Gateway Performance with a Routing–Table Cache," Proceedings IEEE INFOCOM '88, pp. 298–307, Mar. 1998.

Ferrer, M. L., Fluckiger, F., Heiman, G., Mirabelli, G., Pace, E., Valente, E., "Gift: A Multiple Gateway for File Transfer, Access, and Management," IEEE Journal on Selected Areas in Communications, vol. 8, No. 1, pp. 99–106, Jan. 1990.

Foglesong, J., Richard, G., Cassell, L., Hogan, C., Kordas, J., Nemanic, M., "The Livermore Distributed Storage System: Implementation and Experiences," Tenth IEEE Symposium on Mass Storage Systems, pp. 18–25, May 1990.

Gecsei, J., "The Architecture of Videotex Systems," © 1983 by Prentice–Hall, Inc., Englewood Cliffs, NJ 07632.

Gozani, S., Gray, M., Keshav, S., Madisetti, V., Munson, E., Rosenblum, M., Schoettler, S., Sullivan, M., Terry, D., "GAFFES: The Design of a Globally Distributed File System," Report No. UCB/CSD 87/361, Computer Science Division (EECS), University of California Berkeley, Jun. 1987.

Manss, T., "University of Michigan Institutional File System," /AIXtra, pp. 25–32, Jan. 1992.

Hardy, D. R., Schwartz, M. F., "Harvest User's Manual Version 1.0," CU–CS–743–94, Department of Computer Science, University of Colorado at Boulder, Oct. 1994.

Hogan, C., Cassell, L., Foglesong, J., Kordas, J., Nemanic, M., Richmond, G., "The Livermore Distributed Storage System: Requirements and Overview," Tenth IEEE Symposium on Mass Storage Systems, pp. 6–17, May 1990.

Maekawa, et al., "Distributed Operating System—That's What Follows UNIX," Kyoritsu Publishing Co., Ltd., pp. 114–117, Dec. 1991.

Mecozzi, D., Minton, J., "Design for a Transparent, Distributed File System," Eleventh IEEE Symposium on Mass Storage Systems, pp. 77–84, Oct. 1991.

Mockapetris, P., "Domain Names—Concepts and Facilities," Request for Comments: 1034, Network Working Group, Nov. 1987.

Mockapetris, P., "Domain Names—Implementation and Specification," Request for Comments: 1035, Network Working Group, Nov. 1987.

Mockapetris, P. V., Dunlap, K. J., "Development of the Domain Name System," Proceedings of ACM SIGCOMM '88, Computer Communication Review, vol. 18, No. 4, pp. 123–133, Aug. 1988.

Muntz, D., Honeyman, P., "Multi–level Caching in Distributed File Systems," CITI Technical Report 91–3, University of Michigan Center for IT Integration, Aug. 1991.

Muntz, D., Honeyman, P., "Multi–Level Caching in Distributed File Systems—or—Your Cache Ain't Nuthin' but Trash," Proceedings of the Winter 1992 USENIX Technical Conference, pp. 305–314, Jan. 1992.

Murray, K. "Wisdom: The Foundation of a Scalable Parallel Operating System," Department of Computer Science, University of York, Feb. 1990.

Murray, K. A., Wellings, A. J., "Wisdom: a Distributed Operating System for Transputers," Computer Systems: Science and Engineering, vol. 5, No. 1, pp. 13–20, Butterworth & Co. (Publishers) Ltd., Jan. 1990.

Nelson, M. N., Welch, B. B., Ousterhout, J. K., "Caching in the Sprite Network File System," ACM Transactions on Computer Systems, vol. 6, No. 1, pp. 134–154, Feb. 1988.

Postel, J., Reynolds, J., "Domain Requirements," Request for Comments: 920, Network Working Group, Oct. 1984.

Rao, H. C.–H., "The Jade File System," Department of Computer Science, University of Arizona, Aug. 1991.

Siegal, A., Birman, K., Marzullo, K., "Deceit: A Flexible Distributed File System," Proceedings of the First Workshop on the Management of Replicated Data, pp. 15–17, Nov. 1990.

Slegal, A., Birman, K., Marzullo, K., "Deceit: A Flexible Distributed File System," TR 89–1042 Department of Computer Sciences, Cornell University, Nov. 1989.

Siegal, A., Birman, K., Marzullo, K., "Deceit: A Flexible Distributed File System," Proceedings of the USENIX Summer Technical Conference, p. 51–52, Jun. 1990.

Su Z.–S., Postel, J., "The Domain Naming Convention for Internet User Applications," Request for Comments: 819, Network Working Group, Aug. 1982.

Terry, B. D., "Distributed Name Servers: Naming and Caching in Large Distributed Computing Environments," Report No. UCB/CSD 85/228, Progress Report No. 85.4, Computer Science Division (EECS) University of California Berkeley, Mar. 1985.

Transarc Corporation, "Cache Update—Information Exchange for the AFS Community," vol. 1, No. 4, Oct. 1990.

Zayas, E. R., "AFS–3 Programmer's Reference: File Server/Cache Manager Interface Version 1.1," Transarc Corporation FS–00–D162, Aug. 1991.

Zayas, E. R., "AFS–3 Programmer's Reference: Architectural Overview Version 1.0," Transarc Corporation FS–00–D160, Sep. 1991.

* cited by examiner

EX PARTE REEXAMINATION CERTIFICATE ISSUED UNDER 35 U.S.C. 307

THE PATENT IS HEREBY AMENDED AS INDICATED BELOW.

AS A RESULT OF REEXAMINATION, IT HAS BEEN DETERMINED THAT:

The patentability of claim 18 is confirmed.

Claims 1–17 and 19 are cancelled.

* * * * *